TRANSISTORIZED VOLTAGE REGULATOR
Filed Sept. 12, 1960
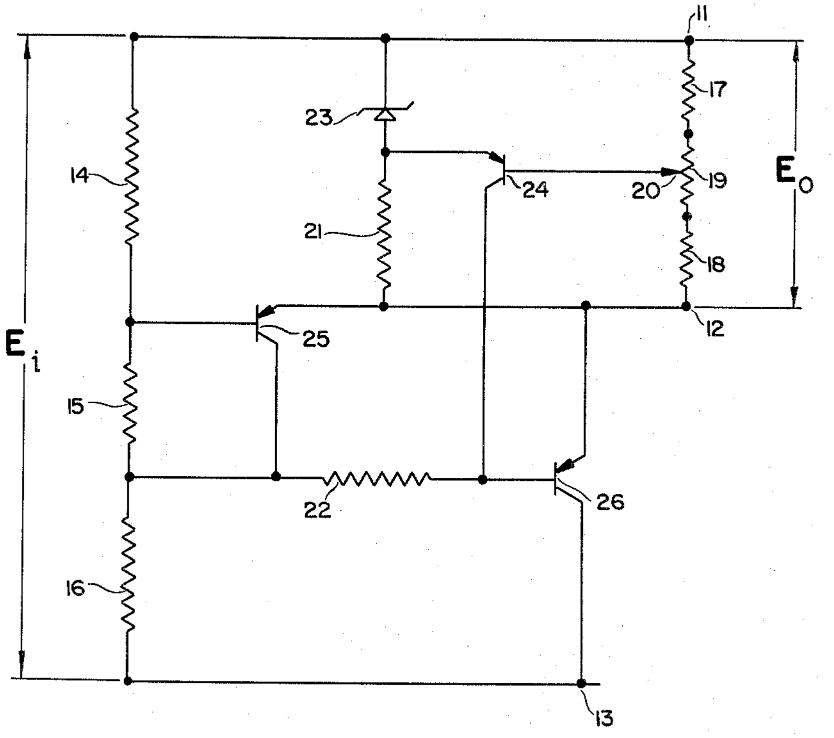
INVENTOR.
LeROY D. BARTER
BY
ATTORNEY 3,116,447

TRANSISTORIZED VOLTAGE REGULATOR

Le Roy D. Barter, Fullerton, Calif., assignor to Beckman Instruments, Inc., a corporation of California Filed Sept. 12, 1960, Ser. No. 55,576
6 Claims. (Cl. 323—22)

This invention relates generally to voltage regulating devices. More specifically, this invention relates to a transistorized device for generating, between a common first terminal and a second terminal, an output voltage which adheres closely to a predetermined value and is largely independent of variations in a supply voltage that is applied across the first common terminal and a third terminal. In this type of regulator, the output voltage is also largely independent of variations in load impedance.

Transistorized voltage regulators of this type are well known in the art. As a primary voltage stabilizing device in such regulators, a reversely biased silicon diode, known commonly as a "Zener" diode, has often been used. These diodes have the property of becoming highly conductive when a reverse voltage higher than a given voltage is applied to them. Normally, a "Zener" diode is used in one arm of a bridge circuit, the three other arms being provided with ohmic circuit elements in which current varies linearly with respect to applied voltage. The voltage to be regulated is applied to a pair of diagonally opposite junctions of the bridge and an error voltage signal is measured between the remaining pair of diagonally opposite junctions. This error voltage signal is indicative of the departure of the voltage to be regulated from a preselected value and is determined by the characteristics of the members in each of the bridge arms. The error voltage is amplified, preferably by a transistor amplifier, to provide a signal that is applied to a transistor, the emitter-collector circuit of which interconnects the second and third terminals.

In order to obtain a highly regulated voltage between the first and second terminals, it might seem obvious to utilize a multi-stage error voltage amplifier having a higher gain than is obtainable, for instance, with a single transistor stage amplifier. Unfortunately, it is not feasible to use a simple two-stage transistor amplifier for this purpose because the impedances cannot be adequately matched. Prior art approaches have required the error voltage amplifier to comprise a first-stage, the input terminals of which are connected to the bridge, and a cascaded push-pull second stage utilizing two transistors. If a second stage utilizing a single transistor is employed, it is necessary to insert a very low impedance voltage divider, which may require a current as high as 0.5 ampere for a regulated voltage of 20 volts and obviously is not practical for most applications. Also, the approach that requires a push-pull stage is relatively expensive and hence not suitable for low cost application.

It is an object of the invention to provide a simple voltage regulator that is relatively low in cost but nonetheless provides a highly regulated output voltage.

It is a further object of the invention to provide a highly regulated power supply which utilizes a minimum number of transistors without requiring a very low impedance divider for impedance matching purposes.

The present invention obviates the drawbacks of the prior art solutions by providing a voltage regulator which comprises a voltage sensing bridge, a first transistor connected as an amplifier in circuit with the output voltage of the bridge, a second transistor operated by the transistor amplifier to provide a variable conductance path between a terminal that carries a regulated voltage and a terminal that carries the unregulated voltage, and a third transistor that regulates the supply voltage for the transistor amplifier.

The single FIGURE of the drawing shows a schematic circuit diagram of a preferred embodiment of a voltage regulator according to the invention.

The voltage regulator circuit of the invention is shown connected at terminals 11 and 13 to an unregulated supply $E_i$. Regulated output voltage $E_o$ is generated between terminal 11 and a terminal 12, and as may be seen, terminal 11 is common to the terminal pairs of output and supply. A potential divider comprising the resistors 14, 15 and 16 is connected across the supply terminal pair 11, 13. A voltage sensing bridge comprises resistors 18, 21, which are both connected at one end to regulated voltage terminal 12, a Zener diode 23 and a resistor 17, which are both connected at one end to the common terminal 11. The remaining end of the Zener diode is connected to resistor 21, and the remaining end of resistor 17 is connected through a potentiometer 19, having a movable contact 20, to resistor 18. It is readily seen that these members together constitute a bridge circuit. The input terminals of the bridge consist of terminal 11, which is electrically identical with the junction of the Zener diode 23 and the resistor 17, and terminal 12, which is electrically identical with the junction of resistors 21 and 18. One output terminal of the bridge consists of the junction of Zener diode 23 and resistor 21, and the second one, of the movable contact 20. The base electrode of a transistor 24 is connected to the contact 20, the emitter to the junction of resistor 21 and Zener diode 23, and the collector through a resistor 22 to the junction of resistors 15 and 16. The collector of transistor 24, illustrated as PNP type, is also connected to the base of a PNP transistor 26, the emitter of which is connected to terminal 12 and the collector of which is connected to terminal 13. A PNP transistor 25 has its emitter connected to terminal 12, its collector to the junction of resistors 15 and 16 and its base to the junction of resistors 14 and 15.

The operation of the circuit of the invention as described thus far is as follows: The voltage sensing bridge, formed by members 17, 18, 19, 21 and 23, serves to provide a signal between the movable contact 20 of potentiometer 19 and the junction of Zener diode 23 and resistor 21 in response to any departures of the voltage across terminals 11 and 12 from a given balance value. As will appear more clearly below, the Zener diode is reversely biased in the circuit. The essential characteristics of a Zener diode when it is reversely biased may be summarized as follows. With a small reverse bias the diode remains essentially nonconductive or conducts a very small current only. When the reverse bias reaches a given breakdown value, the Zener diode begins to conduct heavily and with a further increase of the voltage the current increases at a higher rate than the voltage increases. This behavior makes the Zener diode suitable as a voltage regulating device. In the circuit of the invention, when the voltage across terminals 11 and 12 is such that the voltage across the Zener diode is at the breakdown voltage, a further increase in voltage across terminals 11 and 12 will cause relatively greater increase in the voltage drop across resistor 21 and relatively smaller increase in the voltage drop across the Zener diode.

On the other hand, a change in the voltage across terminals 11 and 12 will cause directly proportional changes in the voltages across resistors 17 and 18. The movable contact 20 of the potentiometer 19 serves to shift the output voltage of the bridge so that the output voltage may be set at a desired value, as will become clear from the following explanation.

Let it be assumed that the potential at common terminal 11 is constant. In the circuit of the invention this condition may be assured, for instance, by connecting this terminal to ground; however, in actual operation and usage, another terminal such as terminal 12 can be grounded. The aforesaid assumption is made only to define a reference that allows a simple description of the voltage variations that take place in the operation of the circuit. Assume further that the potential of terminal 13, which is shown as negative with respect to terminal 11, is lowered and hence that the voltage between terminals 11 and 13 is increased.

With the above assumptions, since PNP transistor 26 constitutes a conductive path between terminals 13 and 12, the potential of the latter will also show at least a tendency to be lowered. This in turn involves a lowering of the potential at contact 20 since the voltage thereof relative to terminal 11 is equal to the resistance between the contact and terminal 11 divided by the total resistance of elements 17, 18 and 19 and multiplied by the voltage between terminals 11 and 12. On the other hand, the potential at the junction of resistor 21 and Zener diode 23 is comparatively constant, when the Zener diode is operated at its breakdown voltage. This is always the case when the voltage between terminals 11 and 13 is higher than a minimum value determined principally by the values of the resistor 21 and the breakdown voltage of the Zener diode 23. The result of the described voltage changes at contact 20 and the junction of the Zener diode 23 and resistor 21 on transistor 24 is that the base potential of transistor 24 is lowered with respect to its emitter potential, thereby causing an increase of the collector current of transistor 24, and accordingly, an increase in the voltage drop across resistor 22. As will be explained later, the voltage drop across resistor 16, which is also in the collector circuit of transistor 24, is not substantially involved. The increased voltage drop across resistor 22 causes the potential of the base of transistor 26 to be raised with respect to that of the emitter, resuling in a decreased emitter current of that transistor and a decrease in current from the elements that interconnect terminals 11 and 12 whereby the potential of terminal 12 tends to rise.

It is thus seen that the amplifying transistor 24 and the shunting transistor 26 coact to keep the voltage at terminal 12 at such a level that the voltage across the Zener diode is equal at least substantially to the breakdown voltage of the diode. When the voltage across terminals 11 and 13 is higher than the value required to keep the voltage across the Zener diode at the breakdown voltage, the regulating action immediately begins so that an increase in voltage between terminals 11 and 13 results principally in an increase in voltage between terminals 13 and 12. Only a relatively small increase in voltage occurs between terminals 11 and 12. Obviously, the regulation of the circuit of the invention is dependent on the gain of transistor 24 since it is necessary that the change in voltage at the base of transistor 26 be larger than the tendency of the emitter to undergo a change in the same direction. Improvement of the regulation could be obtained if it were feasible to substitute a two-stage amplifier for the single transistor 24. However, as mentioned above, this is only practical with an amplifier having a push-pull second stage, because a single transistor second stage requires an impractically low impedance voltage divider.

When considering the changes that the potential of the base of transistor 26 undergoes as a result of changes in the potential of terminal 13, it will be seen that the former potential would be influenced by two opposite effects if transistor 25 were left out of consideration. Because of the action of transistor 24 there is a tendency for the base potential of transistor 26 to be raised when the potential of terminal 13 is lowered, as explained. However, at the same time there is a tendency for the base potential of transistor 26 to be lowered because this electrode is connected through resistors 22 and 16 to terminal 13, which was initially assumed to be lowered. These effects would, of course, counteract each other and result in unsatisfactory over-all circuit regulation. According to the invention, however, transistor 25 is provided to regulate the potential at the junction of transistors 15 and 16 so that substantially the total change in voltage drop across resistor 22, due to a change in potential of terminal 13, remains available at the base of transistor 26.

PNP transistor 25 is connected with its emitter to terminal 12, its collector to the junction of resistors 16 and 22 and its base to the junction of resistors 14 and 15. Resistors 14, 15 and 16 are connected in series between terminals 13 and 11.

The effect of transistor 25 upon the circuit operation can be understood from the following consideration. The potential of terminal 12 is comparatively more constant than the potential of the junction of resistors 14, 15 because of the regulating action of transistors 24 and 26. Consequently, a lowered potential of terminal 13 will initially tend to lower the base potential of transistor 25 with respect to its emitter potential, thereby increasing the collector current of transistor 25 which, in turn, raises the voltage drop across resistor 16 which, in turn, tends to raise the potential of the junction of resistor 15, 16. It is thus seen that these elements constitute a regulating feedback loop that tends to reduce changes in the voltage between the junction of resistors 15, 16 and terminal 12. This means that the influence of changes in potential of terminal 13 on the base potential of transistor 26 is also reduced because substantially the entire change in voltage drop across resistor 22 originating from a change in the potential of terminal 13 results in a corresponding change of the emitter-base voltage of transistor 26. Accordingly, the action of transistor 25 results in greatly improved circuit regulation.

In the foregoing we have assumed as the disturbing effect a decrease of the potential of unregulated terminal 13. It will be obvious that an increase in potential (or a reduced potential difference between terminals 11 and 13, terminal 11 assumed to be at a constant potential) will have an opposite effect.

The operation of the circuit may be summarized in the following way. Transistor 25 regulates the current through resistor 16 so that the variations in potential of the unregulated terminal 13 are for the greater part, reflected in variations in voltage drop across resistor 16. Transistor 24 regulates the voltage drop across resistor 22 so that the transistor 26 has an emitter current of such magnitude that the potential of terminal 12 is at the value which is associated with the voltage breakdown value of Zener diode 23. Consequently, an output voltage $E_0$ is provided that is substantially independent from variations of the voltage $E_i$, as long as $E_i$ is sufficiently high to keep the Zener diode at the breakdown voltage. This latter condition is easily fulfilled in normal practice.

Typical values and identification of the components in the circuit of the FIGURE are as follows:

| | | |
|---|---|---|
| Resistor 14 | ohms | 24K |
| Resistor 15 | do | 1.8K |
| Resistor 16 | do | 2K |
| Resistor 17 | do | 800 |
| Resistor 18 | do | 600 |
| Resistor 19 | do | 50 |
| Resistor 21 | do | 3K |
| Resistor 22 | do | 2K |
| Zener diode 23 | volts | 13 |
| Transistor 24 | | 2N466 |
| Transistor 25 | | 2N466 |
| Transistor 26 | | 2N1172 |

In a circuit constructed with the aforesaid components the output or regulated voltage (24 v.) varied only 0.8% as much as the unregulated supply voltage. For instance, an increase in the unregulated voltage from 30 to 40 volts resulted in an increase in the regulated output of 80 millivolts. An upper limit to the unregulated voltage that can be supplied is set by the current carrying capacity of the transistors utilized.

From the foregoing, it should be obvious to those skilled in the art that numerous changes can be made without departing fom the spirit of the invention. For instance, the transistors might be of opposite type, thereby necessitating corresponding changes in the polarities of the voltages involved and the orientation of the Zener diode. Other voltage regulating devices may be used instead of the Zener diode. In fact, any device the conductance of which is functionally dependent on the voltage applied to it, may, at least in principle, serve the same purpose. If a Zener diode is used, substantial independence of temperature effects may be obtained by selecting one with characteristics which combine with the characteristics of the emitter-base diode of transistor 24 to produce the desired temperature effect compensation.

I claim:

1. A voltage regulating circuit having first, second and third terminals wherein an unregulated supply voltage is applied between said first and third terminals and a regulated output voltage is generated across said first and second terminals, in combination: a voltage sensing bridge with first and second junctions thereof connected between said first and second terminals, said bridge comprising one circuit element having nonlinear voltage versus current response and three circuit elements having a substantially linear voltage versus current response, said bridge generating an output voltage at third and fourth junctions thereof intermediate said first and second junctions, a first transistor having its base electrode connected to one of said third and fourth junctions, its emitter electrode connected to the other of said third and fourth junctions and its collector electrode connected through a first resistor to a supply point of said circuit, a second transistor having its emitter-collector path connected between said second and third terminals, the collector of said first transistor being connected to the base of said second transistor for varying the conductance of the emitter-collector path of said second transistor and thence the conductance between said second and third terminals in response to departures from the voltage between said first and second terminals from a given voltage, means for regulating the voltage between said first terminal and said supply point comprising a second resistor connected between said point and said third terminal, a voltage divider having third and fourth resistors connected between said point and said first terminal and a third transistor connected with its emitter-collector path between said second terminal and said point and its base to the junction of said third and fourth resistors of said voltage divider, the collector current of said third transistor generating current in said second resistor for creating a voltage drop thereacross that tends to regulate the voltage between said supply point and said first terminal.

2. A voltage regulating circuit having first, second and third terminals wherein an unregulated supply voltage is applied to said first and third terminals and a regulated output is generated across said first and second terminals in combination: a voltage sensing bridge having input terminals and output terminals, the input terminals of said voltage sensing bridge connected to said first and second terminals of said circuit, a first transistor having emitter and base electrodes connected to the output terminals of said voltage sensing bridge, and having a collector electrode connected through a first resistor to a supply point of said circuit; said supply point intermediate in voltage between said first and third terminals and being connected through a second resistor to said third terminal, a second transistor having an emitter-collector path interconnecting said second and third terminals and having a base electrode connected to the collector of said first transistor, said voltage sensing bridge, said first transistor, said first resistor and said second transistor counteracting variations of the voltage between said first and second terminals, means for regulating the voltage of said supply point of said circuit with respect to said first terminal, comprising third and fourth resistors connected in series between said supply point and said first terminal, a third transistor having emitter and base electrodes connected respectively to the junction of said third and fourth resistors and said second terminal for increasing the collector current of said third transistor and a corresponding change in voltage drop in said second resistor in response to an increase in voltage between said second and third terminals, so that the voltage between said supply point and said first terminal of said circuit is kept relatively constant and changes in voltage drop across said first resistor result in nearly equal changes of the emitter-base voltage of said first transistor.

3. A voltage regulating circuit having a common terminal, a regulated voltage terminal and an unregulated voltage terminal, comprising a voltage sensing bridge for providing an output voltage in response to departures of the voltage between said common terminal and said regulated voltage terminal from a given voltage; an amplifier including a first transistor having base, emitter and collector electrodes, the output voltage of said bridge being applied across the emitter and base electrodes of said first transistor; a first resistor connected between a supply point of said circuit and the collector electrode of said first transistor, said supply point being connected through a second resistor to said unregulated voltage terminal, a second transistor having base, emitter and collector electrodes, the emitter collector circuit of said second transistor being connected across said regulated and unregulated voltage terminals and the base electrode of said second transistor being connected to the collector electrode of said first transistor; means for regulating the voltage between said supply point and said common terminal including a third transistor having base, emitter and collector electrodes and having the collector electrode connected to said supply point, the emitter electrode connected to said regulated voltage terminal and the base electrode to the junction of third and fourth resistors that are connected in series between said supply point and said common terminal.

4. A voltage regulating circuit having common, unregulated and regulated voltage terminals comprising in combination: voltage sensing means for providing an error signal that is indicative of the departure of the voltage between said common and regulated voltage terminals from a predetermined value, means including a first transistor having emitter, base and collector electrodes for amplifying said error voltage; a first resistor connected between the collector of said first transistor and a supply point, said supply point being connected through a second resistor to said unregulated voltage terminal, a second transistor having emitter, base and collector electrodes for providing a path with variable conductance between said regulated and unregulated voltage terminals, the base of said second transistor being connected to the collector of said first transistor; said variable conductance being increased when the voltage between said common terminal and said regulated voltage terminal increases; means for regulating the voltage between said supply point and said common terminal comprising third and fourth resistors connected in series between said supply point and said common terminal; a third transistor having emitter, base and collector electrodes, the base electrode of said third transistor being connected to the junction of said third and fourth resistors, the emitter electrode to said regulated voltage terminal and the collector electrode to said supply point, whereby the collector current of said third transistor increases in response to an increase in voltage between the supply point and the common terminal.

5. A circuit for providing a relatively constant voltage between common and regulated voltage terminals substantially independent of variation in supply voltage that is applied between an unregulated voltage terminal and said common terminal, comprising in combination: a Zener diode and a first resistor in series therewith connected between said common terminal and said regulated voltage terminal, a first potential divider having a voltage tap terminal connected between said common and regulated voltage terminals, a first PNP transistor having emitter, collector and base electrodes, said collector electrode connected to the junction of said Zener diode and said first resistor, a second PNP transistor having emitter, collector and base electrodes, the collector of said first transistor connected to the base of said second transistor with the emitter of said second transistor connected to said regulated voltage terminal and the collector connected to the unregulated voltage terminal, a second resistor connected between said base of said second transistor and a supply point, said supply point being the junction of a second resistor and a second potential divider, said second resistor with the end remote from the supply point connected to said unregulated voltage terminal and said second potential divider connected between said supply point and said common terminal, said second potential divider having a voltage tap; a third PNP transistor having emitter, collector and base electrodes, with its emitter electrode connected to said regulated voltage terminal, its base electrode to the voltage tap of said second potential divider and its collector electrode to said supply point.

6. A voltage regulating circuit wherein unregulated voltage is supplied between an unregulated voltage terminal and a common terminal and regulated voltage is obtained between a regulated voltage terminal and said common terminal, said circuit comprising means for generating an error signal voltage in response to the departure of the regulated voltage from a predetermined reference value, the combination of: first amplifying means having an output and amplifying the error voltage; variable conductance means having a control terminal connected to said output and interconnecting said unregulated and regulated voltage terminals in feedback relation for reducing the error signal; a first resistor interconnected between a supply point of the circuit and the output of said first amplifying means; second amplifying means comprising a transistor whose emitter is connected to the regulated voltage terminal, it base to the tap of a potential divider interconnected between the supply point and the common terminal and its collector to the supply point; a second resistor interconnected between the supply point and the unregulated voltage terminal so that the collector current of said transistor causes a voltage drop in said second resistor that opposes voltage variations of said unregulated voltage terminal and tends to stabilize the voltage at said supply point.

References Cited in the file of this patent

UNITED STATES PATENTS

| | | |
|---|---|---|
| 2,971,102 | Schultz | Feb. 7, 1961 |
| 2,984,779 | Klees | May 16, 1961 |

FOREIGN PATENTS

| | | |
|---|---|---|
| 1,054,506 | Germany | Apr. 9, 1959 |